May 17, 1960

A. H. McCANN 2,936,970

HELICOPTER

Filed July 12, 1954

INVENTOR.
ALBERT H. McCANN
BY Morton S. Adler
ATTORNEY.

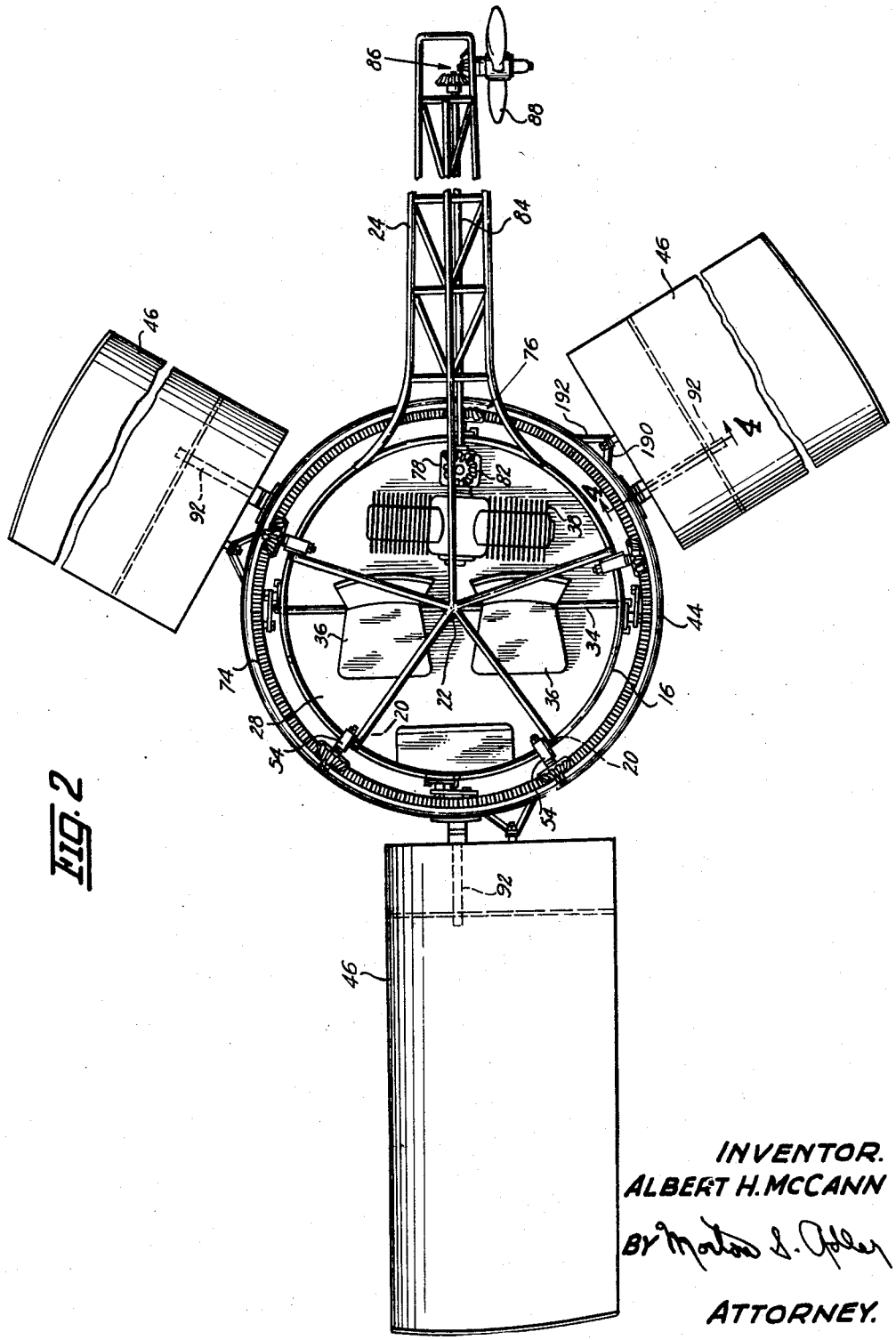

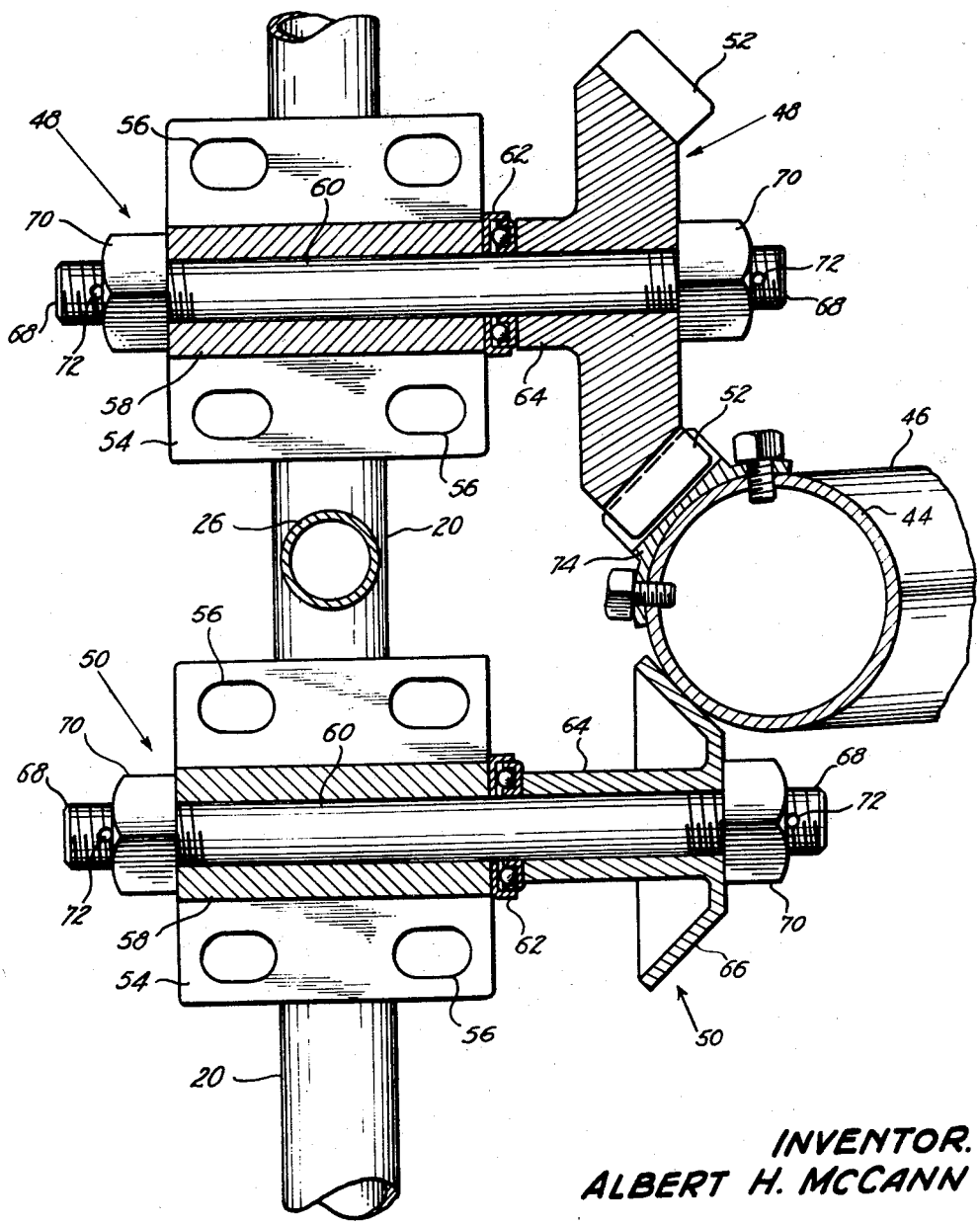

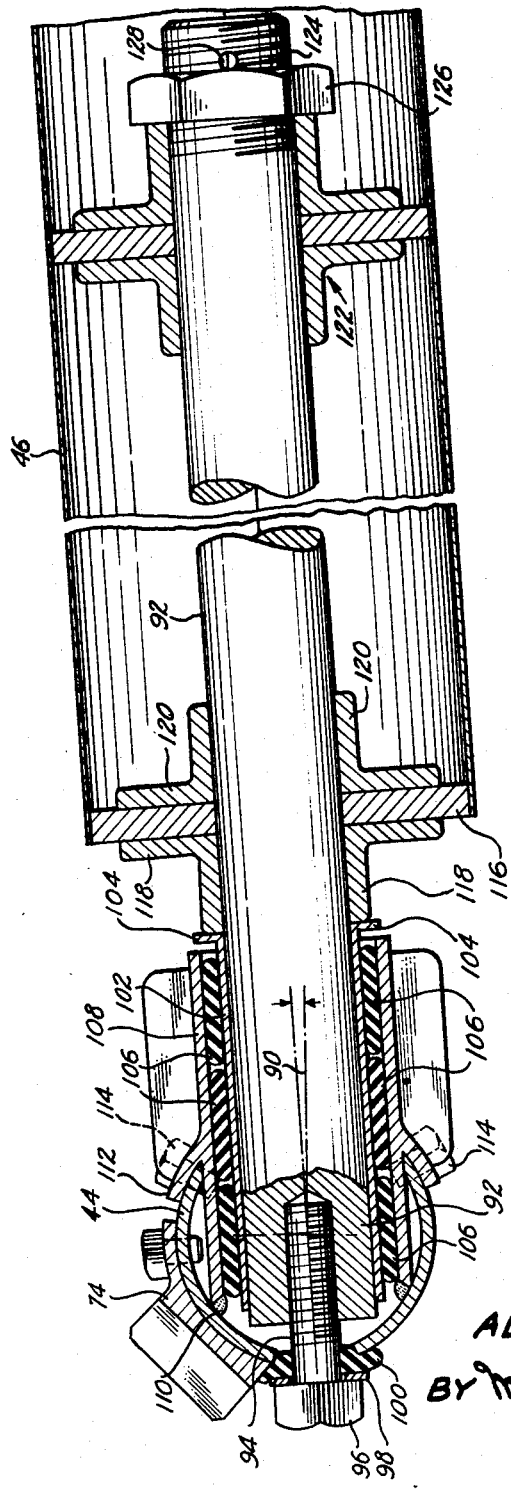

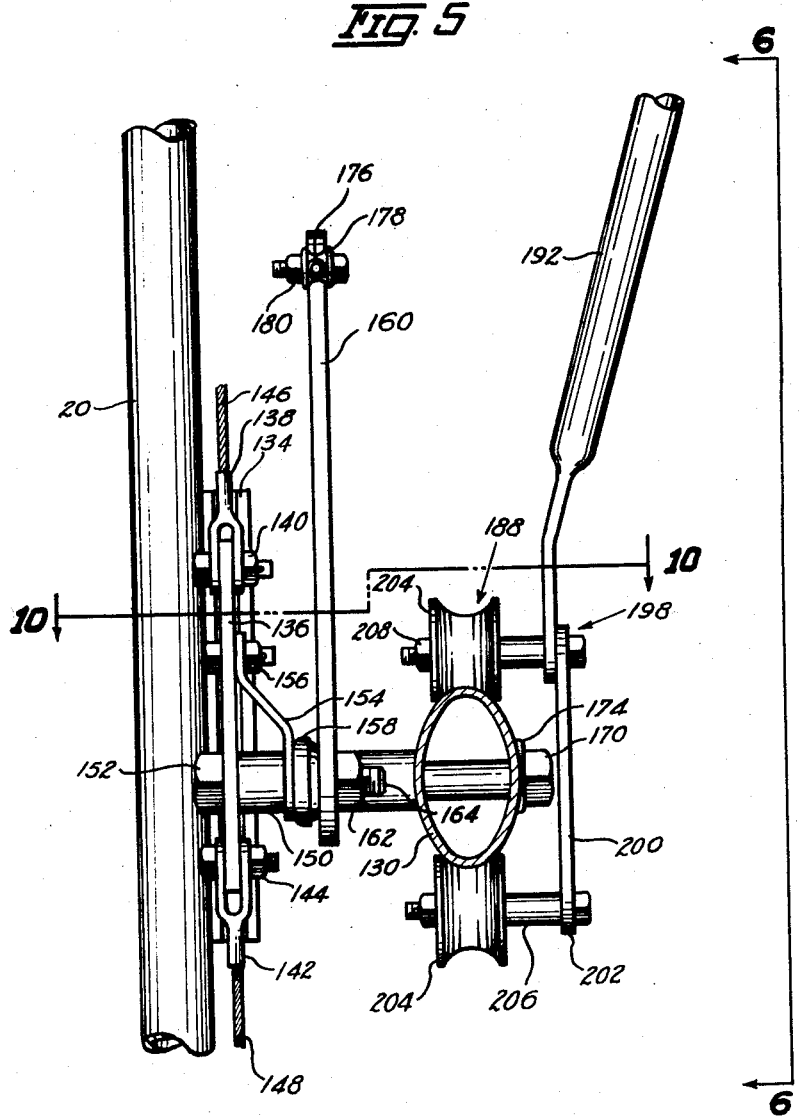

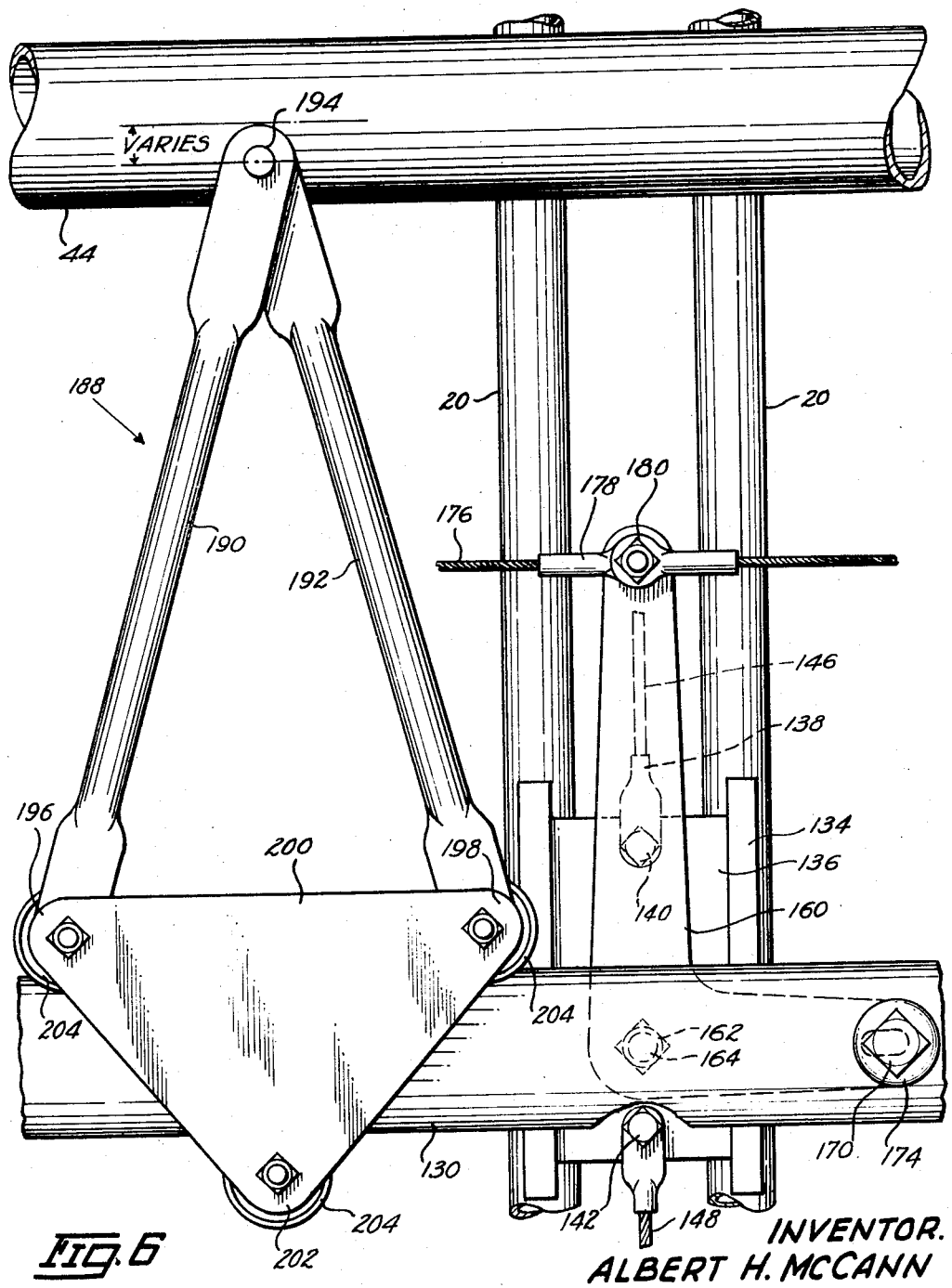

May 17, 1960 A. H. McCANN 2,936,970
HELICOPTER
Filed July 12, 1954 8 Sheets-Sheet 7
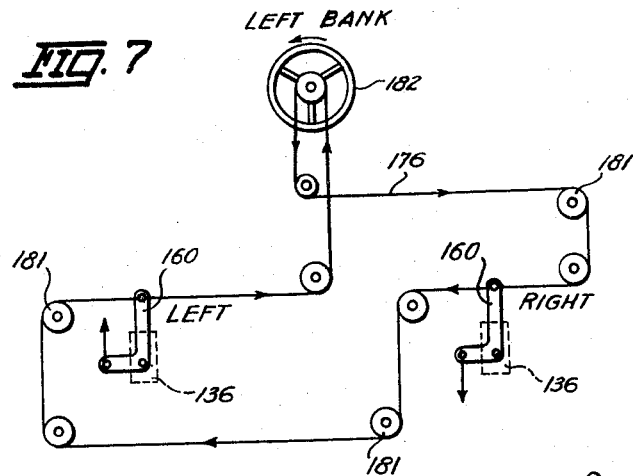
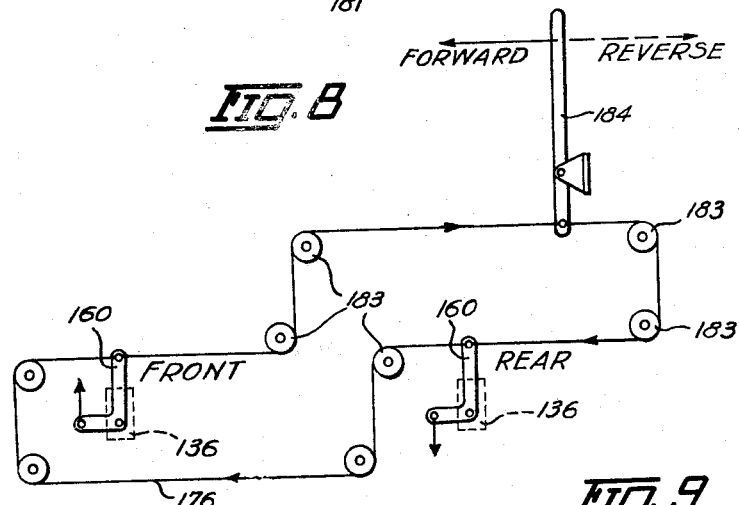
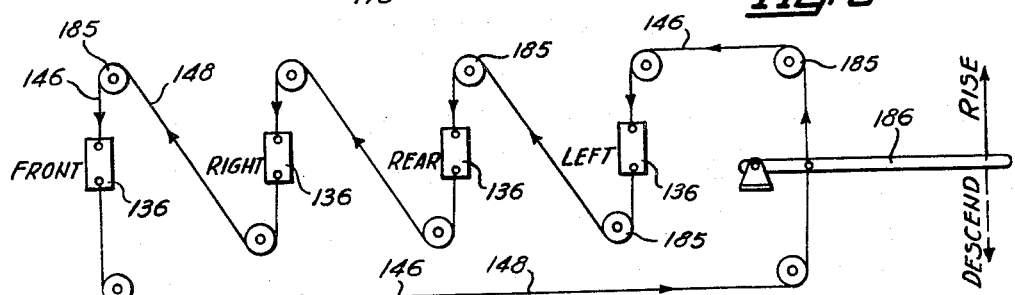
INVENTOR.
ALBERT H. McCANN
BY Morton S. Adler
ATTORNEY.

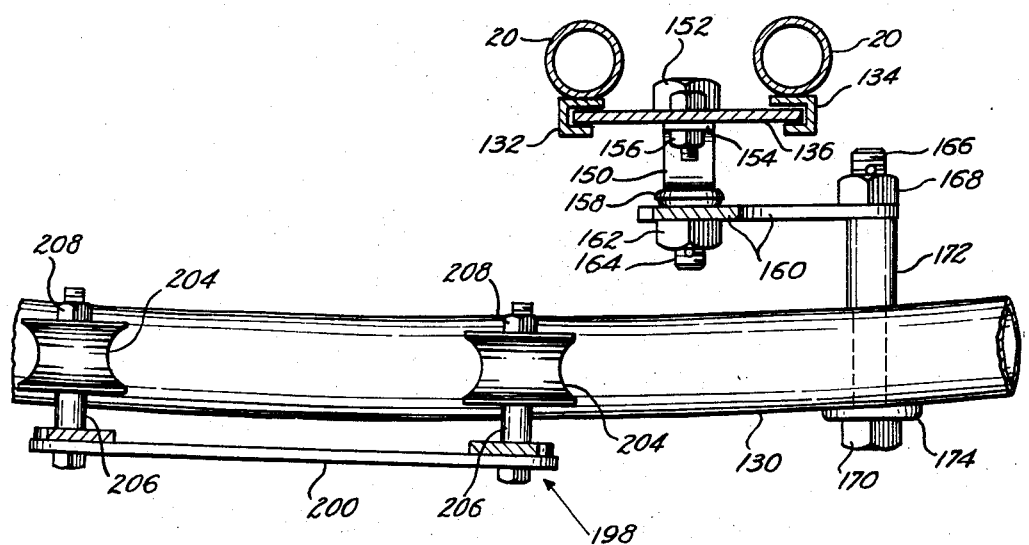
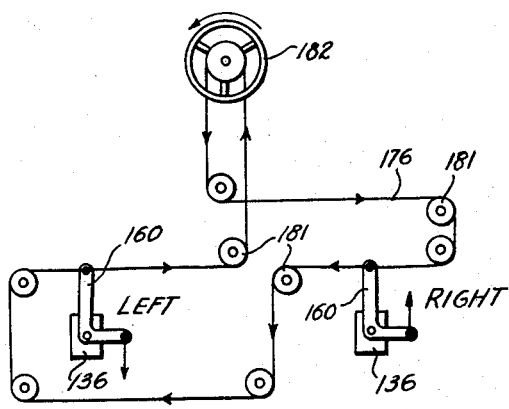
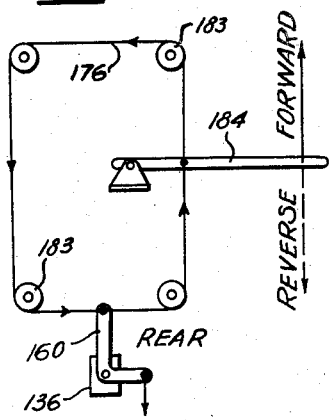

United States Patent Office 2,936,970
Patented May 17, 1960

2,936,970

HELICOPTER

Albert H. McCann, Clinton, Iowa

Application July 12, 1954, Serial No. 442,771

15 Claims. (Cl. 244—17.11)

My invention relates to improvements in helicopters. In over a century and a half since man has flown in one type of machine or the other probably no device for flight has so seized and fired the imagination as the helicopter. Its conception goes back as far, if not farther, than that of the airplane, and yet it was not until the late nineteen thirties that the first practical helicopter emerged from the countless experiments that had previously failed to solve the mysteries of this type of flying machine. The utility of the helicopter in being able to hover, fly sideways, backwardly and forwardly without requiring any velocity for sustention by the air and to ascend or descend in a vertical plane is a realization of the age old dream of designers for an ideal aircraft to serve the transportation needs of the multitude.

It seems inevitable that in time to come many millions of persons will pilot aircraft for private reasons as distinguished from commercial use as is the case with automobiles today and in such an evolution of transportation media the helicopter, which does not require forward velocity for sustention by the air, can well become the type of flying machine to fill that demand and serve that purpose since of all man's mechanical creations for transportation, the helicopter is the most controllable, and it is the only flying machine that does not require an airport with long flat runways for its use. As yet, however, the helicopter while developed in principle, is, like the conventional or fixed-wing airplane, so costly to build and maintain that it is available to a relative few who can afford them or to governmental bodies and large industrial establishments. These high costs are due in part at least, to several design features which so far have made impractical and uneconomical the development and production of a helicopter for the average family and within a price range, for example, of a present day medium priced automobile. Since one of the important objects of this invention is to provide a helicopter of this class, I would like to point out some of the disadvantages and problems in present helicopter design as a basis for a better understanding of the objects of this invention and of the structure which I have designed to carry out those objectives as will later appear.

While problems of maneuverability and control of the helicopter have been basically solved, such machines are as yet incapable of creating an efficient and useful lift relative to its weight or to attain a satisfactory forward air speed due to the use of high speed, low lift rotor blades which require excessively large engines to produce a total lift barely sufficient to sustain the craft in the air and move it at relative slow speeds of 85 to 125 miles per hour. These disadvantages can perhaps be better understood if I more clearly point out several of the structural characteristics which are usually incorporated in present day helicopters and which I have eliminated as will be apparent from the description of my invention hereinafter.

In the helicopter at present, the rotors are more nearly propellers than wings and are essentially low lift, high speed air foils of extremely high aspect ratio that result in a blade which is structurally weak. These blades are subjected to high unit loadings and are made to operate at high rotational speeds that result in considerable flutter and vibration under some flight conditions so as to greatly increase the chance of fatigue failure of the rotor blades.

I have also observed that one of the basic characteristics of helicopter construction is the fact that all rotor blades radially extend from a common hub mounted on a vertical shaft of the engine so that the plane of rotation of such rotors describes approximately a disc. In such construction, that portion of the disc having a radius of approximately one-fourth of the length of the rotor contributes practically nothing to the total lift capacity of the rotors because of the relatively low tangential velocity of the blade which approaches zero at the center of the hub, and as a result, about one-fourth of the length of each rotor, therefore, contributes nothing to the performance thereof but adds considerably to the weight of the craft. It will thus be apparent that one of the reasons for excessively large engines on helicopters, as pointed out previously, is the absorption of extra horsepower by the induced drag of that portion of the rotor blade which performs no useful work. It will also be appreciated that the tip speed of present helicopter rotors is very high so that the angle of attack of the blades near the ends must be greatly reduced in order to minimize flutter and vibration and this results in decreased thrust and efficiency of the outer one-fourth of the disc described by the rotating blades. Thus, the largest part of the resultant thrust of such rotors is developed in the middle half of each blade so that additional horsepower is absorbed in overcoming the excessive drag at the ends of the rotors. It is thus obvious that present helicopter blades have excessive length relative to the efficient thrust developed and since the moment arm of a blade is increased by extra length thereof, such blades as are presently used are inherently weak.

Another aspect of the rotor assembly which I would like to point out is the small but exceedingly complicated mechanism for attaching the rotors at the end of the vertical engine shaft. This mechanism is required to transmit stresses of great magnitude to the fuselage and because of the limitations in size inherent in present helicopter design, this assembly requires machining to extremely fine tolerances that are of course very expensive. In addition, this mechanism is inherently subject to excessive deterioration from ordinary atmospheric conditions encountered in flight and yet is located at a point above the fuselage where it is very difficult to service and maintain.

I have also made certain improvements relative to the fuselage of the helicopter, as will later appear, and these also can perhaps be best understood by first describing present structures with my observations on what appear to be the disadvantages thereof.

The design of the helicopter fuselage is quite similar to that of a small airplane, being long and narrow and generally providing space for a pilot in the nose, followed by the engine compartment, then fuel tanks and an extended tail section to support a variable pitch propeller which controls the lateral stability of the ship. The engine usually occupies all of the space in the fuselage near the center of gravity of the craft so that the necessary placement of other objects such as personnel, fuel tanks, cargo, etc., results in varying locations for the center of gravity which is thus relatively large and increases the problems concerned with maintaining the trim of the ship which are inherently greater and more difficult to overcome than will be apparent from the description of my craft.

Another common characteristic in present helicopters is the fact that the fuselage is located almost entirely within the slip stream from the rotors, so that the kinetic energy of this high velocity stream of air results in a considerable parasite drag. Other structural aspects of the fuselage including those mentioned above result in unsatisfactory arrangement for cargo and passengers and in obstructed vision to the rear for the pilot.

With these observations and comments in mind it is the general aim of my invention to provide, a helicopter characterized by several novel and improved structural features capable of materially improving the flight performance as compared to present craft and also susceptible of being manufactured at such a reasonable cost as to be substantially within the same price range as today's medium priced automobiles and thus available for purchase by the masses.

More particularly it is an important object of this invention to mount the rotors or wings for rotation about the perimeter of a substantially circular fuselage in such a way as to develop a large vertical thrust at a low rotational speed and low horsepower.

Another object of my invention is to place the rotors and fuselage in such relative positions that the fuselage is not within the slip stream from the rotors and thereby eliminates any parasite drag from the kinetic energy of the slip stream.

A further object of this invention is to provide changes in the fuselage design of a helicopter for materially improving conditions relative to the center of gravity, center of lift, passenger and cargo space and visibility as compared with those conditions and problems as exist in the present state of the art.

Other objects of my invention are to provide a helicopter of the above class in which my improved structural characteristics are not only considerably more accessible for inspection but materially more economical to service and maintain.

These and other objects will be apparent to those skilled in the art.

My invention consists in the construction, arrangement and combination of the various parts of the device, whereby the objects contemplated are attained as hereinafter more fully set forth, and specifically pointed out in my claims, and illustrated in the accompanying drawings, in which:

Fig. 2 is a top plan view of the illustration shown in Fig. 1,

Fig. 3 is an enlarged view partly in section taken on the line 3—3 of Fig. 1,

Figure 1:
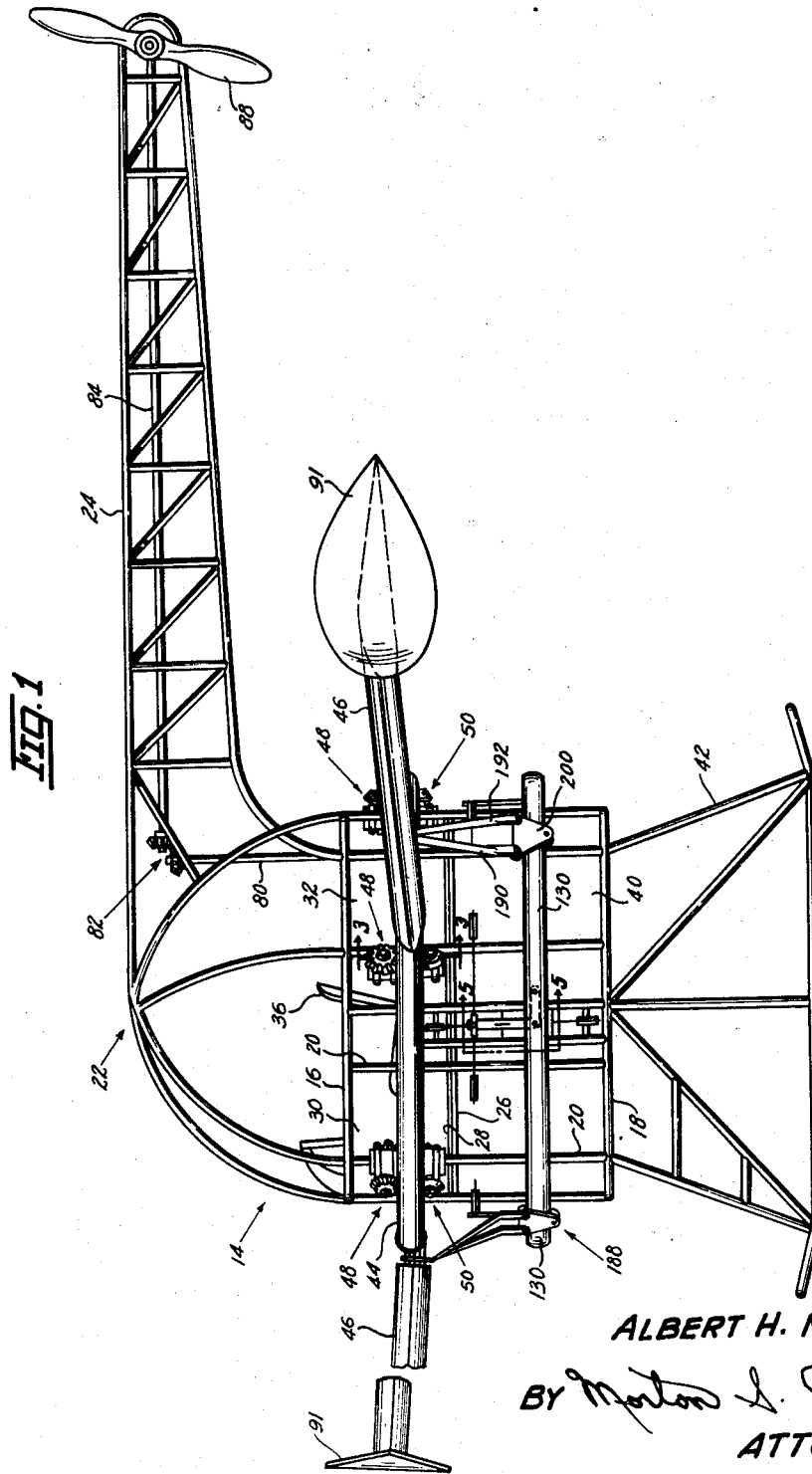
Fig. 1 is a side elevational view of my new helicopter.

Fig. 4 is an enlarged cross sectional view showing the attachment of one of the wings to the rotating torque tube and taken on the line 4—4 of Fig. 2, Fig. 5 is an enlarged view of a fragmentary section taken from the line 5—5 of Fig. 1 showing the control tube in section and its connecting assembly to part of a vertical member of the frame structure, Fig. 6 is an enlarged elevational view of the caster and bell crank assemblies taken from line 6—6 of Fig. 5, Figs. 7, 8, and 9 are schematic views illustrating directional control for my new helicopter, Fig. 10 is a cross sectional view taken on the line 10—10 of Fig. 5 to show the structure of my vertically slidable plate and bell crank associated with the control assembly of this craft, and Figs. 11 and 12 are schematic views illustrating alternate methods of controlling the desired motions of the control tube.

Referring now to the drawings and initially to Figs. 1 and 2 the fuselage which is basically a braced circular structure on a horizontal plane is shown generally at 14. It is preferably formed from tubular material and consists of the upper and lower tubular ring frame members 16 and 18 disposed respectively on a horizontal plane and in vertical spaced relationship. A plurality of vertical struts 20 equally spaced about the circumference of frame members 16 and 18 connect the same and some of these are extended upwardly from the upper ring 16 where they radially converge in a curved path to a central point 22 to form a dome-like top portion. A boom 24 consisting of an elongated braced frame structure is suitably secured to the upper portion of the fuselage between ring 16 and point 22 and extends rearwardly therefrom on substantially a horizontal plane as shown. Intermediate rings 16 and 18 is disposed a circular reinforcing tube or ring 26 that is secured to struts 20 and serves as a support for a floor 28 of the cockpit 30 and engine compartment 32 (Fig. 1) which are separated by a partition 34 (Fig. 2). Seats 36 for pilot and passengers can be located in the cockpit 30 and the engine 38 and fuel will of course be in the engine compartment 32. Below the floor 28 there will be available another compartment 40 for storage of cargo, fuel and the like. Depending from the fuselage 14 is a suitable landing gear 42 for which no invention is claimed and which may be formed with skids, wheels, pontoons or the like as may be required or desirable under particular operating conditions. It will of course be understood also, that I have illustrated only the framework of my fuselage and boom and that a suitable covering therefore will be provided for actual flight operations. The circular form of this fuselage as disclosed is an efficient geometrical shape because the volume enclosed is great in relation to the area of the enclosing walls and the circle is a structural form of good inherent stability that can be easily braced to resist all forces which it will encounter in flight. It will also be apparent that the circular fuselage has excellent symmetry in all directions which results in short moment arms for all loads placed in the fuselage so that varying loads could cause very little movement of the center of gravity of the ship as a whole and would not disturb the trim of the craft. The cargo space located below the cockpit floor is easily accessible from all sides of the fuselage and it will be understood that this space could readily be increased in ships having greater power than one designed for private use, to provide sufficient room for a passenger cabin on a lower deck in addition to the cargo space. The advantages of a circular fuselage will become further apparent from the description of my invention which follows but I wish to specifically point out that a fuselage having shape which is a true circle in cross section is not necessary per se since a multi-sided fuselage such as a five, six, seven or eight sided arrangement, for example, can be adapted to serve the principle here presented so long as a plurality of points on the fuselage could be connected by an endless line circular in shape.

With reference now to Figs. 1, 2 and 3 particularly, I wish to describe one of the important novel aspects of my invention which relates to a circular member or ring which I have called a torque tube 44 that is circular in cross section and carries two or more high lift wings 46 in spaced relationship about the perimeter thereof. Tube 44 is mounted for rotation about the circular fuselage 14 in the following manner. On each of the struts 20 just below frame ring 16 there is mounted in vertical spaced relationship a bevel gear idler and a smooth idler shown in Fig. 3 and indicated generally by the respective numerals 48 and 50. These idlers are of like construction except for the gear teeth 52 on idler 48 and thus like parts will be given like numbers in the description thereof. A bearing block 54 is suitably secured to strut 20 as shown and is adapted for vertical adjustment thereon. For this purpose, I have provided opening 56 in block 54 for receiving a U-bolt (not shown) and it will be understood that other means may be employed to serve the desired purpose. A shaft bearing 58 is carried by block 54 and supports the shaft 60 on a horizontal plane so that a portion of shaft 60 extends outwardly slightly from the fuselage. Mounted on such extending shaft portion is a ball thrust bearing 62 followed by the idler gear 64 and as pointed out previously, idler 48 has the gear teeth 52 while idler 50 has the smooth face 66. The respective ends of shaft 60 are threaded as at 68 to receive a nut 70 and openings 72 through such shaft ends may be provided for a cotter pin to keep the nuts 70 from coming off. These idlers 48 and 50 support the torque tube 44, as shown in Fig. 3 which has suitably secured thereto the ring gear 74 that meshes with the teeth 52 on idler 48 and is free to revolve about the vertical axis of the ship. Rotation of this torque tube 44 is provided by a drive gear 76 at the rear of the fuselage and connected to a gear box with clutch 78 (Fig. 2) associated with engine 38 in a well known manner so that the torque tube can be free to rotate if necessary without engine power. A vertically disposed drive shaft 80 connects to a power take off means associated with the gear box 78 and connects by a bevel gear assembly 82 to a horizontally disposed drive shaft 84 extending rearwardly through the boom 24 to a bevel gear assembly 86 arranged for driving the variable pitch propeller 88. Thus, propeller 88 can be driven from the torque tube 44 so that its operation by rotation of the torque tube is assured in case of engine failure. No invention is claimed in the drive shaft arrangements for connecting the propeller 88 to the engine 38 since such structure is well known in the art and it is also pointed out that suitable means in any well known form for varying the pitch of propeller 88 will be used but since no invention is claimed therefore, the same has not been shown.

The attachment of wings 46 to the torque tube 44 constitutes another of the novel aspects of this invention and for purpose of describing this structure reference is had particularly to Fig. 4 and also Figs. 1 and 2. While two or more wings 46 may be used I have preferably shown three uniformly spaced around the circumference of the torque tube 44 and projecting substantially perpendicularly therefrom with due regard however for the dihedral angle indicated on Fig. 4 by the numeral 90. These wings in cross section are an airfoil well known in the art and may be provided with the end plates 91 (Fig. 1) to increase the efficiency of the wings at the tips by reducing losses due to formation of tip vortices.

The main supporting element for the wing 46 is the solid metal shaft 92 having one end portion which I shall call the inboard end, disposed within the torque tube 44 and secured by a bolt 94 of which the bolt head 96 engages the outer surface of tube 44 and on the inner side thereof so that the longitudinal axis of the bolt 92 and the shaft 92 are transversely of the axis of the tube 44 as illustrated. Intermediate the bolt head 96 and tube 44 a metal washer 98 and a resilient gasket of rubber or the like 100 are mounted on the bolt shank so that gasket 100 abuts against the torque tube. A metal sleeve 102 is arranged on the inboard end of shaft 92 and extends beyond the outer edge of tube 44 where it is provided with the flange 104 that projects outwardly therefrom at right angles. Sleeve 102 is not secured and serves as a bearing surface for rotation of shaft 92 as will later appear. On the sleeve 102 is mounted a series of resilient collar members 106 in endwise space relationship so that their overall length is substantially co-extensive in length therewith, and surrounding collars 106 is the tubular sleeve or housing 108 which has its inner end disposed within the torque tube 44 and secured thereto as by a weld 110. Tube member 108 also has an external circumscribing flange 112 which embraces a portion of the outer surface of the torque tube 44 and is secured thereto at several places about its circumference with the bolts 114 so that both an internal and external securing means is provided in attaching sleeve 108 to the torque tube 44.

For mounting the wing 46 to the shaft 92 the inboard rib 116 is provided with the oppositely disposed bearing flanges 118 and 120 and a similar arrangement is provided for one or more of the other wing ribs as indicated generally at 122. An axial opening through flanges 118 and 120 and an opening through the respective ribs allows the wing to be mounted on shaft 92 as shown in Fig. 4 and the inboard end of flange 118 will abut against the outer side of flange 104. The outer end of shaft 92 is threaded as at 124 to receive a nut 126 and the hole 128 is provided for a cotter pin. It will be understood that the length of the shaft 92 will depend upon the size of the wing 46 so that shaft 92 extends far enough into the wing that stress in the main span of the wing can be transferred thereto and through the same to the torque tube 44. I would also like to point out that from the above disclosure relative to Fig. 4 it will be appreciated that there is no metal to metal contact in the attachment of the wing supporting shaft 92 to the torque tube 44 and consequently there is no transfer of vibration to or from the wing and torque tube as the mounting means shown in Fig. 4 actually floats in rubber so that there is a 360° freedom to the wings for flapping and hunting movements during acceleration and when the gusts are encountered in flight.

The variation in thrust of the high lift wings 46 is accomplished by a novel control system for varying the angle of attack of the wings and for purpose of describing this structure, reference is had more particularly to Figs. 5–12. A circular member or ring which is non-rotating and which I call the control tube 130 is oval in cross section and is disposed about the circular fuselage 14 in spaced relationship below the torque tube 44, and its various movements as will later be described are from a normal position in a horizontal plane parallel to the torque tube 44. Tube 130 is operatively connected for support and manipulation to the fuselage at preferably four uniformly spaced points of suspension or attachment located respectively at the front, right and left sides and rear thereof, but may have a lesser number of supporting points as I will later discuss. Each of these support and control points are similar in structure and thus I have shown only one (Figs. 5 and 10) for purposes of this description.

To each of two adjacent struts 20 of the fuselage 14 is suitably secured the respective vertically disposed channel guide members 132 and 134 arranged so their channel shaped portions are oppositely disposed for receiving the respective end portions of a vertically slidable plate 136. To the top edge of plate 136 at a point intermediate struts 20, there is secured the clevis 138 by means of the bolt and nut 140 and at the lower edge of plate 136 the clevis 142 is similarly secured by bolt and nut 144 in a vertical plane with clevis 138. Cables 146 and 148 respectively are secured to clevis 138 and 142 and form part of a cable control system that will be later described. A spacer member 150 is secured at one end to plate 136 above bolt 144 by means of the bolt 152 and extends perpendicularly therefrom towards, but not to the control tube 130 and the bracket or brace 154 is mounted to spacer 150 and secured to plate 136 below nut 140 by the bolt and nut 156 as shown in Figs. 5 and 10. On spacer 150 following the brace 154 is first a thrust bearing 158 and then a bell crank 160 secured at its heel pivot point by the nut 162 and bolt 164.

The outer end of the lower arm of each bell crank 160 is fastened to the control tube 130 (Figs. 6 and 10) by means of a suitable bolt 166, nuts 168 and 170, spacer 172, and tapered washer 174 providing movable pivot points for the support of control tube 130 at the four equally spaced points around the circumference thereof at which the four respective bell crank assemblies are located. The top of the upper arm of each bell crank 160 is secured to a control cable 176 by means of a suitable clevis 178 which is attached to the bell crank by the bolt and nut 180.

The sliding plate 136 and bell cranks described provide three independent control means, one of which is used in right and left turns, one in the forward and reverse movement and the other in the rise and descent. It is also pointed out that all four of the plates 136 move together in the same direction as will later appear, the sliding plates 136 and the bell crank assemblies are manipulated in pairs and that the four such control points are located at opposite ends of two perpendicular diameters of the control tube 130 at the front, right and left and rear of the pilot relative to forward movement. The operation of these controls for the respective movements will be later described in detail, but to complete the description here of their general relationship reference is had to Figs. 7–9. For right and left turns, cables 176 on the two oppositely disposed bell cranks at the right and left of the pilot are connected by a system of pulleys 181 to a steering wheel 182. The respective bell cranks at the front and rear of the pilot have the cables 176 connected by pulleys 183 to a lever 184 and for the rise and descent the plates 136 which are supported by cables 146 and 148 (Fig. 5) are connected by these cables and pulleys 185 to lever 186.

The connection between the control tube 130 and the rotor blades or wings 46 is accomplished by means of caster assemblies indicated generally by the numeral 188 in Figs. 1, 5 and 6, with one such assembly being provided for each wing or rotor blade. This assembly 188 comprises a pair of vertically disposed elongated push pull rods or tubular members 190 and 192 having their upper ends fastened to a single point of attachment to a shaft 194 (Fig. 1) extending from the inboard end of the wing 46 at a point rearwardly of the point of attachment of the wing to the torque tube 44 relative to the direction of rotation of the blades 46. From the point of attachment to shaft 194, rods 190 and 192 diverge so the lower ends thereof (Fig. 6) are secured to two points 196 and 198 on the same plane of the triangular frame or trolley 200. Points 196 and 198 are slightly above the upper surface of the control tube and point 202 on frame 200 extends below the lower surface thereof. Trolley 200 itself is disposed at the outer side of control tube 130 and contains casters 204 which are suitably mounted in spaced relationship inwardly from each of the points 196, 198 and 202 by means of spacers 206 and bolts and nuts 208. Each caster 204 has a surface concave in cross section to be complementary with the surface of the tube 130 and the two casters opposite points 196 and 198 ride on the upper surface of the tube while the caster opposite point 202 engages the under side thereof. Trolley 200 moves over the control tube as the blades rotate and as the tube 130 is moved out of a parallel horizontal relationship with tube 44 they cause a corresponding movement of the blades 46 which controls the ship as I shall now point out.

In general, as the caster assemblies 188 are pulled around the control tube or ring 130 by the wing 46 to which each is attached, the angle of attack of the wing will be decreased as the pilot causes the control tube 130 to rise and will be increased when the pilot causes the control tube 130 to descend. When the angle of the plane of the tube 130 becomes parallel to that of the torque tube 44, the resultant thrust of the wings 46 is vertical and will cause the ship to rise or descend vertically. However, if the plane of the control tube 130 is inclined relative to that of the torque tube 44, the angle of attack of each wing or blade 46 will change constantly as it rotates to produce a higher lift on one side of the ship than on the other and thus cause the craft to bank. When this occurs, the resultant thrust of the wings will not be vertical and a horizontal component will be developed which will cause the ship to move horizontally. The horizontal speed of the ship will depend entirely upon the magnitude of the horizontal component of the thrust. Since the weight of the ship remains constant, the vertical component of the total thrust remains constant for level flight conditions and the horizontal movement will be varied according to the change in the total resultant thrust of the wings and the angle of inclination of the plane of the ship with the horizon. Together with this general description of my control means it will of course be understood that the rotational moment of the torque tube 44 is counteracted by the well known variable pitch propeller 88 mounted at the end of the boom 24. This propeller will operate at a constant rotational speed with the pitch of the blades controllable by the pilot by a rudder bar, pedal or the like known to the art to turn the ship to right or left at will.

It will be appreciated from the immediate preceding general description that the essential function of my control system is to cause the plane of the control tube 130 to vary from its normal position parallel to the plane of the torque tube 44 in such a manner as to cause a portion of the control tube to approach the rotating torque tube while that portion of the control tube directly opposite across the fuselage will recede from the rotating torque tube by an equal amount. In other words, if the plane of the rotating torque tube is considered to be horizontal, then it must be possible for the pilot to cause the control tube to tilt in any direction and at any angle of tilt that may be necessary to obtain the degree of control of the ship which is desired. The effect of thus tilting the control tube in this manner is to cause a variation in the angle of attack of the rotor blades as they revolve around the fuselage.

With reference now to Fig. 7, I have indicated by a schematic diagram the operation of my controls to cause a left bank of the ship with a corresponding horizontal movement of the ship to the left and for a right bank, it will be understood that the cables shown will be moved in the opposite direction indicated by the arrows in Fig. 7. It is pointed out that the sliding plates 136 and bell cranks 160 in Fig. 7 are located at opposite ends of a diameter of the control tube 130 and for the operation illustrated are at the right and left hand sides respectively of the ship relative to the direction of forward movement or in other words relative to the direction in which the pilot will be facing.

When the steering wheel 182 is turned as indicated by the arrow at the top thereof, the bell cranks 160 will move in the direction indicated by the arrows on cable 176. This will cause the outer end of the lower arm on the left bell crank to rise and the corresponding portion of the right bell crank to descend by an equal amount which in turn will cause the control tube 130 to pivot about the other two control and support points located respectively at the front and rear of the fuselage. The effect of this operation is to increase the angle of attack of the rotor blades when they approach the right side of the ship and decrease the angle of attack when they approach the left side, thus causing an excess of lift on the right side and a corresponding tilting and lateral motion of the ship to the left.

In Fig. 8 the operation of the bell cranks oppositely located at the front and rear respectively of the ship are shown diagrammatically and the operation is similar to that of Fig. 7 but for a forward and reverse movement. In Fig. 8 when the lever 184 is moved in the direction indicated, the lower arm of the front bell crank rises while the like arm on the rear bell crank descends to cause an increased angle of attack at the rear of the ship and a corresponding tilting and lateral motion of the ship in a forward direction. Likewise by reversing the movement of lever 184 a rearward motion can be obtained.

In Fig. 9 there is illustrated schematically the support and control means for the vertically sliding plates 136.

In this figure it will be observed that all four of the plates 136 are controlled simultaneously and that the motion of all of the plates is in the same direction and by equal amounts. Thus, as illustrated, when lever 186 is moved in the direction designed "rise," the cables 146 and 148, which are in effect one system, will move as shown by the arrows thereon so that all four plates move downwardly to cause a uniform increase in the angle of attack of the rotors or wings 46 as they revolve, causing the ship to rise. Conversely, movement of the lever 186 toward "descend" will result in all plates moving upwardly to cause a uniform decrease in the angle of attack of the rotors so the ship will descend.

In Figs. 11 and 12 I have shown diagrammatically an alternate method of controlling the desired movements of the control tube 130, sliding plates 136 and bell cranks 160 by using only three points of attachment about the circular fuselage 14 instead of four as above described. These three points are equally spaced along the circumference of the control tube 130 with two of the points located respectively at the left and right of the pilot forwardly of the center of the fuselage and the third one being located at the rear of the fuselage. In this arrangement the left and right bell cranks are controlled simultaneously similar to the corresponding units in Fig. 7 for banking the ship to right or left and the arrows on the cables in Fig. 11 show the direction of movement thereof for raising the left side and lowering the right to increase the angle of attack of the wings as they approach the left side and thus tilt the ship for a right bank. The remaining bell crank at the rear is controlled as shown in Fig. 12 whereby the control tube 130 can be moved toward or away from the torque tube and pivots on the two lateral supporting points represented by the bell cranks in Fig. 11 to cause the forward or rearward movements respectively of the ship. No additional illustration of controlling the plates 136 in the three point arrangement is shown since it is the same as in Fig. 9 less the plate at the front.

The control systems shown in Figs. 7, 8 and 9 are entirely independent of each other and the same is true relative to Figs. 11 and 12 and the system similar to Fig. 9 less the front plate.

It will be appreciated from the foregoing description that this helicopter has many novel and improved structural changes designed to materially improve the flight performance over the present art. Illustrative of these changes are the torque tube, control tube, high lift wings and circular fuselage which has been previously pointed out and described but which will have the additional characteristics and advantages that I should like to discuss.

With regard to the torque tube 44, it is pointed out that the circular cross-section thereof is the most efficient structural section for resisting torque and also has good aerodynamic characteristic together with a low parasite drag. All of the bending moment transmitted by the wing to the attachment fitting of the torque tube must be resisted by the torsional strength of this tube and the torsional stresses developed in this tube cause deformations about the center line axis of the tube itself. The tendency of these stresses to twist the tube have no effect on the bevel gear idlers 48 or the smooth idlers 50 and the secondary bending in the torque tube due to vertical shear transmitted to the tube by the wing fitting is minimized by the use of an adequate number of support points about the fuselage which results in a low span for the torque tube considered as a beam.

In the non-rotating control tube 130 it will be observed that the oval shape of the cross-section thereof is very efficient structurally in resisting the bending moment induced by the pressure of the casters 204 and also has good resistance to the secondary torsion stresses. The shape of this tube, as with the torque tube, has excellent aerodynamics characteristics and very low parasite drag. In addition this oval shape allows the casters to move freely and smoothly and by making the shape of the casters complementary to that of the control tube, the casters have in effect deep rims which provide good resistance against being dislodged from the tube. This control tube 130 is small and light and can be easily moved in response to the controls in the fuselage. The number of control points or locations to which the control tube is operatively connected establishes the reaction points for the tube 130. When four points of suspension are used as I have preferably illustrated and described, the controls result in low bending stress in the control tube. However, such controls, when four in number, must be moved simultaneously in opposite pairs to prevent warping of the control tube. If a three point suspension or attachment is used, each suspension point can be moved independently of the others to vary the angle of the control tube and cause lateral movement of the ship. This, however, results in the points of attachment being rather widely spaced and tends to induce considerable bending in the control tube.

With reference to my high lift wings I would like to point out again that they are capable of providing a vertical thrust of considerable magnitude at relatively low rotational speed and thus one of the chief advantages of this wing design over present helicopter wings or rotors is the fact that my wings with the characteristics mentioned can now be successfully applied to helicopters. The compact form of my rotors as illustrated and described are susceptible of successful operation on a helicopter of relatively small diameter so as to make possible the production of a craft of this type within a price range for the masses. Such a craft has high performance characteristics and will operate in a very restricted space. With my innovations as disclosed a three passenger ship, for example, capable of developing 5500 pounds of vertical thrust has an overall diameter of only thirty feet. The rotatational speed of the wings of such size craft is approximately 135 to 150 revolutions per minute and requires an engine of about 300 horsepower. A 200 horsepower engine, however, may be used and will develop a maximum thrust of about 4500 pounds. Such sizes and dimension as here given are merely illustrative, as it will be understood that while I preferably utilize my design for relatively small medium priced craft, larger wings can be used within feasible limits of the torque tube size to produce a helicopter along the principles disclosed that is capable of carrying considerably larger passenger and cargo loads for commercial or military use.

It should also be brought out that the cost of fabricating my helicopter wings is low since they are similar to wings currently being manufactured for airplanes. However, my wings are less complicated than those of an airplane because no flaps or aileron mechanism are necessary. The low rotational speed of wings 46 results in a low tip speed which eliminates or greatly minimizes any flutter and vibration and also greatly minimizes the tendency toward gyroscopic precession which has been experienced in the use of high speed rotors on present type helicopters. Another advantage of my wings is that their performance requirements are well suited to the application of automatic slats in the leading edges to eliminate burble at high angles of attack, and it will also be appreciated that while I use an internal combustion engine as the source of power for rotating tube 44 and the rotors, suitable jet mechanism may be employed to provide a jet force at the wing tips, for example, in a well known manner without departing from the principles of this invention and also that means could easily be applied to the attachment point thereof to the torque tube to admit of hinging or folding the same for storage in a relatively small area.

With reference now to the fuselage 14, it will be observed that this part of my ship is located entirely out of the slip stream of the high lift wings and is in this respect materially different and results in more efficient utilization of power over present type craft. Consequently, the only parasite drag of the fuselage 14 would result from the actual rate of movement of the ship through the air and would not be complicated by having the high velocity slip stream of the rotors 46 impinging directly on the surface of the fuselage. This obviously makes possible the elimination of excessive motors which present helicopters require because of the absorption by the fuselage as parasite drag of part of the kinetic energy of the moving air in the slip stream of the rotors. It will also be appreciated that because of the design and location of my fuselage, excellent visibility is provided in all directions.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my helicopter without departing from the real spirit and purpose of my invention, and it is my intention to cover by my claims, any modified forms of structure or use of mechanical equivalents which may be reasonably included within their scope.

I claim:

1. In a flying machine, a circular fuselage, a first circular member disposed about the circumference of said circular fuselage, means connecting said first circular member to said circular fuselage to admit of rotation of said first circular member about said fuselage, means for rotating said circular member, a plurality of wings secured to said circular member in spaced relationship about the perimeter thereof, a second circular member disposed about said circular fuselage in spaced relationship below the first, means connecting said second circular member to said circular fuselage against rotation thereabout and in a normal position parallel to the plane of said first circular member, said last mentioned means adapted for vertical movement relative to said circular fuselage and said second circular member movable therewith to uniformly vary its relative position with said first circular member, means connected to said first circular member and adapted for movement on and around said second circular member and connected thereto so that the vertical movement of said second circular member varies the angle of attack of said wings.

2. In a flying machine, a circular fuselage, a first circular member disposed about the circumference of said circular fuselage, means connecting said first circular member to said circular fuselage to admit of rotation of said first circular member about said fuselage, means for rotating said circular member, a plurality of wings secured to said circular member in spaced relationship about the perimeter thereof, a second circular member disposed about said circular fuselage in spaced relationship below the first, means connecting said second circular member to said circular fuselage against rotation thereabout and in a normal position parallel to the plane of said first circular member, said last mentioned means adapted for vertical movement relative to said circular fuselage and said second circular member movable therewith to uniformly vary its relative position with said first circular member, means connected to said first circular member and adapted for movement on and around said second circular member and connected thereto so that the vertical movement of said second circular member varies the angle of attack of said wings, said last mentioned means comprising a pair of elongated rod members connected at a single point of attachment on each respective wing, said rod members diverging toward said second circular member and secured in spaced relationship to a plate, and casters on said plate adapted to respectively engage the upper and under side of said second circular member and to be movable around the circumference thereof.

3. In a flying machine, a circular fuselage, a first circular member disposed about the circumference of said circular fuselage, means connecting said first circular member to said circular fuselage to admit of rotation of said first circular member about said fuselage, means for rotating said circular member, a plurality of wings secured to said circular member in spaced relationship about the perimeter thereof, a second circular member disposed about said circular fuselage in spaced relationship below the first, means connecting said second circular member to said circular fuselage against rotation thereabout and in a normal position parallel to the plane of said first circular member, said last mentioned means comprising a plate member vertically slidably attached to said circular fuselage, a fastening member connecting said plate member and said second circular member so that the latter is movable with said plate member to uniformly vary its relative position with said first circular member, control means for moving said plate member, means connected respectively to each of said wings and adapted for movement on and around said second circular member and connected thereto so that the vertical movement of said second circular member varies the angle of attack of said wings.

4. In a flying machine, a circular fuselage, a first circular member disposed about the circumference of said circular fuselage, means connecting said first circular member to said circular fuselage to admit of rotation of said first circular member about said fuselage, means for rotating said circular member, a plurality of wings secured to said circular member in spaced relationship about the perimeter thereof, a second circular member disposed about said circular fuselage in spaced relationship below the first, means connecting said second circular member to said circular fuselage against rotation thereabout and in a normal position parallel to the plane of said first circular member, said last mentioned means comprising, a plate member vertically slidably attached to said circular fuselage, a fastening member connecting said plate member and said second circular member so that the latter is movable with said plate member to uniformly vary its relative position with said first circular member, control means for moving said plate member, means connected respectively to each of said wings and adapted for movement on and around said second circular member and connected thereto so that the vertical movement of said second circular member varies the angle of attack of said wings, said last mentioned means comprising a pair of elongated rod members connected at a single point of attachment on each respective wing, said rod members diverging toward said second circular member and secured in spaced relationship to a plate, and trolley wheels on said plate adapted to respectively engage the upper and under side of said second circular member and to be movable around the circumference thereof.

5. In a flying machine, a circular fuselage, a first circular member disposed about the circumference thereof, means connecting said first circular member to said fuselage to admit of rotation thereabout, means to rotate said first circular member, a plurality of wings secured to said first circular member in spaced relationship about the circumference thereof, a second circular member disposed about said fuselage in spaced relationship below the first, means connecting said second circular member to said fuselage against rotation thereabout and in a normal position parallel to the plane of the first circular member, said means comprising, a plurality of plate members uniformly spaced about said fuselage and vertically slidably attached thereto respectively, a fastening member connected to each of said respective plate members, control means for moving said plate members in two vertical directions respectively, a bell crank pivotally attached at its heel to each respective fastening member so as to have a normally vertical or upper arm and a horizontal or lower arm respectively, the lower arm of each bell crank secured to said second circular member, control means connected to the upper arm of said bell cranks, means operatively connecting said second circular member to each of said wings, said second circular member movable with said plate members to uniformly vary its relative position with said first circular member whereby the angle of attack of the wings is selectively increased or decreased to obtain a rise or descent respectively of said flying machine, and said second circular member movable with said bell cranks to cause a portion thereof to approach said first circular member while another portion recedes therefrom to effect a bank action with said wings relative to a turn of the machine.

6. In a helicopter, a fuselage, a pair of circular members disposed in vertical spaced relationship about said fuselage, each of said circular members being in a horizontal plane and normally parallel to each other, means operatively connecting said circular members, means connecting the upper circular member to said fuselage for rotation thereabout, means for rotating said upper circular member, means connecting said lower circular member to said fuselage against rotation thereabout, and said last said mentioned means vertically slidably attached to said fuselage so said lower circular member is vertically movable therewith to uniformly vary its relative position with said upper circular member.

7. In a helicopter, a fuselage, a pair of circular members disposed in vertical spaced relationship about said fuselage, each of said circular members being in a horizontal plane and normally parallel to each other, means operatively connecting said circular members, means connecting the upper circular member to said fuselage for rotation thereabout, means for rotating said upper circular member, means connecting said lower circular member to said fuselage against rotation thereabout, said last mentioned means vertically slidably attached to said fuselage so said lower circular member is vertically movable therewith to uniformly vary its relative position with said upper circular member, and control means connecting said lower circular member to said fuselage to vary its relative position with said upper circular member other than uniformly.

8. In a helicopter, a fuselage, a pair of circular members disposed in vertical spaced relationship about said fuselage, each of said circular members being in a horizontal plane and normally parallel to each other, means connecting the upper circular member to said fuselage for rotation thereabout, means for rotating said upper circular member, means connecting said lower circular member to said fuselage against rotation thereabout, said last mentioned means vertically slidably attached to said fuselage so said lower circular member is vertically movable therewith to uniformly vary its relative position with said upper circular member, at least two wings secured to said upper circular member in uniform spaced relationship about the circumference thereof, control means connecting said lower circular member to said fuselage to vary its relative position with said upper circular member other than uniformly, and means operatively connecting said wings to said lower circular member so that their angle of attack in rotation is varied by the respective movements of said lower circular member.

9. In a helicopter, a fuselage, a pair of circular members disposed in vertical spaced relationship about said fuselage, each of said circular members being in a horizontal plane and normally parallel to each other, means connecting the upper circular member to said fuselage for rotation thereabout, means for rotating said upper circular member, a plurality of respective means uniformly spaced about said fuselage for connecting said lower circular member to said fuselage against rotation thereabout, said last mentioned means vertically slidably attached to said fuselage and all movable simultaneously so said lower circular member is vertically movable therewith to uniformly vary its relative position with said upper circular member, at least two wings secured to said upper circular member in uniform spaced relationship about the circumference thereof, and means operatively connecting said wings to said lower circular member so that their angle of attack in rotation is varied by the vertical movement of said lower circular member.

10. In a helicopter, a fuselage, a pair of circular members disposed in vertical spaced relationship about said fuselage, each of said circular members being in a horizontal plane and normally parallel to each other, means connecting the upper circular member to said fuselage for rotation thereabout, means for rotating said upper circular member, a plurality of respective means uniformly spaced about said fuselage for connecting said lower circular member to said fuselage against rotation thereabout, said last mentioned means vertically slidably attached to said fuselage and all movable simultaneously so said lower circular member is vertically movable therewith to uniformly vary its relative position with said upper circular member, at least two wings secured to said upper circular member in uniform spaced relationship about the circumference thereof, control means connecting said lower circular member to said fuselage to vary its relative position with said upper circular member other than uniformly, and means operatively connecting said wings to said lower circular member so that their angle of attack in rotation is varied by the respective movements of said lower circular member.

11. In a helicopter, a fuselage, a pair of circular members disposed in vertical spaced relationship about said fuselage, each of said circular members being in a horizontal plane and normally parallel to each other, means connecting the upper circular member to said fuselage for rotation thereabout, means for rotating said upper circular member, means connecting the lower circular member to said fuselage against rotation thereabout, said last mentioned means vertically slidably attached to said fuselage so said lower circular member is vertically movable therewith to uniformly vary its relative position with said upper circular member, at least two wings secured to said upper circular member in uniform spaced relationship about the circumference thereof, and means operatively connecting said circular members so that the angle of attack of said wings in rotation is varied by the vertical movement of said lower circular member.

12. In a helicopter, a fuselage, a pair of circular members disposed in vertical spaced relationship about said fuselage, each of said circular members being in a horizontal plane and normally parallel to each other, means connecting the upper circular member to said fuselage for rotation thereabout, means for rotating said upper circular member, means connecting the lower circular member to said fuselage against rotation thereabout, said last mentioned means vertically slidably attached to said fuselage so said lower circular member is vertically movable therewith to uniformly vary its relative position with said upper circular member, at least two wings secured to said upper circular member in uniform spaced relationship about the circumference thereof, means operatively connecting said circular members so that the angle of attack of said wings in rotation is varied by the vertical movement of said lower circular member, and control means connecting said lower circular member to said fuselage to vary its relative position with said upper circular member other than uniformly.

13. In a flying machine, a circular fuselage, a first circular member disposed about the circumference thereof, means connecting said first circular member to said fuselage to admit of rotation thereabout, means to rotate said first circular member, a second circular member disposed about said fuselage in spaced relationship below the first, means operatively connecting said circular members, means connecting said second circular member to said fuselage against rotation thereabout in a normal position parallel to the plane of the first circular member, said last mentioned means comprising, a plurality of plate members uniformly spaced about said fuselage and vertically slidably attached thereto respectively, control means for moving said plate members in two vertical directions respectively, said second circular member movable with said plate members to uniformly vary its relative position with said first circular member, a fastening member connected to each respective plate member, a bell crank pivotally attached at its heel to each respective fastening member so as to have a normally vertical or upper arm and a horizontal or lower arm, the lower arm of each bell crank secured to said second circular member, control means connected to the upper arm of said bell cranks for moving the same on its pivot point, and said second circular member movable with said bell cranks to cause a portion thereof to approach said first circular member while another portion recedes therefrom.

14. In a flying machine, a circular fuselage, a first circular member disposed about the circumference thereof, means connecting said first circular member to said fuselage to admit of rotation thereabout, means to rotate said first circular member, a second circular member disposed about said fuselage in spaced relationship below the first, means operatively connecting said circular member, means connecting said second circular member to said fuselage against rotation thereabout in a normal position parallel to the plane of the first circular member, said last mentioned means comprising, a plurality of plate members uniformly spaced about said fuselage and vertically slidably attached thereto respectively, control means for moving said plate members in two vertical directions respectively, and said second circular member movable with said plate members to uniformly vary its relative position with said first circular member.

15. In a flying machine, a circular fuselage, a first circular member disposed about the circumference thereof, means connecting said first circular member to said fuselage to admit of rotation thereabout, means to rotate said first circular member, a second circular member disposed about said fuselage in spaced relationship below the first, means operatively connecting said circular members, means connecting said second circular member to said fuselage against rotation thereabout in a normal position parallel to the plane of the first circular member, a fastening member attached to said last mentioned means, a bell crank pivotally attached at its heel to each fastening member so as to have a normally vertical or upper arm and a horizontal or lower arm, the lower arm of each bell crank secured to said second circular member, control means connected to the upper arm of said bell cranks for moving the same on its pivot point, and said second circular member movable with said bell cranks to cause a portion thereof to approach said first circular member while another portion recedes therefrom.

References Cited in the file of this patent

UNITED STATES PATENTS

| 1,366,067 | Denham | Jan. 8, 1921 |
| 1,915,855 | Hess | June 27, 1933 |
| 2,377,835 | Weygers | June 5, 1945 |
| 2,395,143 | Prewitt | Feb. 19, 1946 |
| 2,521,684 | Bates | Sept. 12, 1950 |
| 2,740,595 | Bakewell | Apr. 3, 1956 |

FOREIGN PATENTS

| 1,018,196 | France | Oct. 8, 1952 |